United States Patent [19]

Bekele

[11] Patent Number: 5,183,706
[45] Date of Patent: Feb. 2, 1993

[54] FORMING WEB FOR LINING A RIGID CONTAINER

[75] Inventor: Solomon Bekele, Taylors, S.C.

[73] Assignee: W. R. Grace & Co.-Conn., Duncan, S.C.

[21] Appl. No.: 562,537

[22] Filed: Aug. 3, 1990

[51] Int. Cl.$^5$ .............................. B32B 7/12
[52] U.S. Cl. ................... 428/349; 428/474.7; 428/474.9; 428/475.8; 428/476.1; 428/500; 428/520; 428/35.4; 428/34.2; 156/244.11
[58] Field of Search ............... 428/349, 474.7, 474.9, 428/475.8, 476.1, 520, 35.4, 34.2, 500; 156/244.11

[56] References Cited

U.S. PATENT DOCUMENTS

| | | | |
|---|---|---|---|
| 2,660,362 | 11/1953 | Schilling | 229/35 |
| 3,866,816 | 2/1975 | Bemiss | 229/14 |
| 3,927,821 | 12/1975 | Dunning | 229/14 |
| 4,230,761 | 10/1980 | Watts | 428/215 |
| 4,533,065 | 8/1985 | Chazal et al. | 220/462 |
| 4,722,474 | 2/1988 | Dropsy | 229/125 |
| 4,828,891 | 5/1989 | Lustig et al. | 428/349 |
| 4,862,671 | 9/1989 | Lanoiselee et al. | 53/167 |
| 4,909,726 | 3/1990 | Bekele | 428/349 |
| 4,927,691 | 5/1990 | Bekele | 428/349 |
| 4,937,112 | 6/1990 | Schirmer | 428/349 |
| 4,977,022 | 12/1990 | Mueller | 428/349 |
| 5,011,735 | 4/1991 | Schirmer | 428/349 |

FOREIGN PATENT DOCUMENTS

| | | |
|---|---|---|
| 0126568 | 11/1984 | European Pat. Off. . |
| 0175451 | 3/1986 | European Pat. Off. . |
| 0323852 | 7/1989 | European Pat. Off. . |
| 1136885 | 12/1968 | United Kingdom . |

OTHER PUBLICATIONS

Melthene 1352T, Tosoh Corp., Testing and Analytical Report (FR).

*Primary Examiner*—Edith Buffalow
*Attorney, Agent, or Firm*—William D. Lee, Jr.; Jennifer L. Skord; Mark B. Quatt

[57] ABSTRACT

A forming web suitable for lining the interior of a rigid or simirigid container, such as a box made from corrugated board, includes an outer sealable layer; an interior barrier layer comprising a polymeric material with low oxygen transmission; a polymeric layer which adds bulk to the web; and an inner adherent layer. The web can also include polymeric adhesive layers for bonding the outer sealable layer to the interior layer, and the bulk layer to the interior and inner adherent layers respectively. More than one bulk or barrier can be included in the present invention.

18 Claims, 3 Drawing Sheets

FORMING WEB FOR LINING A RIGID CONTAINER

FIELD OF THE INVENTION

The present invention relates to the packaging of products, especially food products, and more particularly to forming webs useful in lining rigid or semirigid containers.

BACKGROUND OF THE INVENTION

Rigid and semi-rigid containers made from corrugated paperboard and thermoplastic materials are available in the market place in a variety of sizes. These containers, with or without interior thermoplastic liners or exterior coatings or laminates, offer the packager a container which can withstand the weight of many products, accommodate the large volume of many products, and often provide stackability where necessary for shipping or storage.

Examples of patents directed to containers include U.S. Pat. No. 3,927,821 (Dunning) which discloses a paper board carton having a bottom panel, and side and end walls, with a lining film of plastic adhered to the inner surface of the paper board.

British Patent Specification 1,136,885 (Anderson) discloses a container having an outer casing of comparatively stiff sheet material such as cardboard and an unbroken protective layer of thermoplastic material disposed in the casing. The casing comprises a bottom and a number of upright side walls.

Some containers include horizontal flanges extending either towards the interior of the container or towards the exterior of the container. Examples of patents directed to such containers include U.S. Pat. No. 2,660,362 (Schilling) disclosing a carton with horizontal flaps at each end thereof, and a cover sheet heat sealed to the flaps.

U.S. Pat. No. 3,866,816 (Bemiss) discloses a self supporting outer paper board tray and a plastic liner, as well as laterally extending flanges around the upper edge of the paper board or plastic liner.

U.S. Pat. No. 4,533,065 (Chazal et al) discloses container having a cardboard portion, portions of synthetic material, and an externally extending flange around the upper edge of the container.

Corrugated board containers internally lined with a thermoplastic liner are useful in many packaging applications, including food packaging.

Conventional corrugated paperboard includes two outer liner boards, and an intermediate fluted board located between the two outer liner boards.

Beneficial features of the board (rigidity and strength) are combined with the oxygen and moisture barrier properties of polymeric film. The thermoplastic liner should adhere to the inside surface of the corrugated board container with sufficient adhesion to prevent separation of the liner from the board surface during packaging, storage distribution and display.

When making a container such as that disclosed in U.S. Pat. No. 4,722,474 (Dropsy), using equipment such as that disclosed in U.S. Pat. No. 4,862,671 (Lanoiselee et al) adhesion of the liner to the board can be affected by many factors such as temperature settings on the machine, the physical and chemical composition of the liner, the nature of the product packaged inside the container, the manner of distribution and storage of the filled container, ambient conditions, etc.

The dimensions of the container are also important, since a container such as that disclosed in the Dropsy patent requires a thermoformable liner material which is required to form a deep pocket in the corrugated board shell.

When using the containers just described for packaging some meat and cheese items, it is often advantageous to use modified atmosphere packaging (MAP) techniques well known in the art. MAP can extend the shelf life of some food items. The effectiveness of MAP packaging depends in part on being able to maintain the physical integrity of the package, and avoid the occurrence of pinholes or other breaks in the package materials.

The inventor has discovered that the forming webs of the present invention offer particularly good adhesion to corrugated board, and also provide effective gas barrier for gases such as carbon dioxide, oxygen, or nitrogen used in modified atmosphere packaging methods.

It is therefore an object of the present invention to provide a forming web, for use as a liner in a semirigid or substantially rigid container, which exhibits good adhesion to the interior surfaces of the container.

It is also an object of the present invention to provide a forming web, for use as a liner in a semirigid or substantially rigid container, which exhibits good barrier properties with respect to gases typically used in modified atmosphere packaging, as well as gases, especially oxygen, in the ambient environment on the outside of the finished container.

It is yet another object of the present invention to provide a forming web, for use as a liner in a semirigid or substantially rigid container, which exhibits resistance to flex or stress cracks.

Another object of the present invention to provide a forming web, for use as a liner in a semirigid or substantially rigid container, which exhibits very low shrink and/or memory to prevent delamination of the inventive forming web from the box.

Still another object of the present invention to provide a forming web, for use as a liner in a semirigid or substantially rigid container, which exhibits deep drawability, i.e. the property of the web which allows it to be thermoformed into a relatively deep container.

SUMMARY OF THE INVENTION

In one aspect of the invention, a forming web comprises an outer sealable layer; an interior barrier layer comprising a polymeric material with low oxygen transmission; a polymeric layer which adds bulk to the web; and an inner adherent layer comprising a polymeric material selected from the group consisting of ethylene acrylic acid copolymer, ethylene methacrylic acid copolymer, tackified ethylene vinyl acetate copolymer, and chemically modified olefin polymer or copolymer.

In still another aspect of the invention, the forming web further comprises a polymeric adhesive layer disposed between the outer sealable layer and the interior barrier layer.

In yet another aspect of the invention, the forming web further comprises a polymeric adhesive layer disposed between the interior barrier layer and the bulk layer, and between the bulk layer and the inner adherent layer.

The invention also comprises a method of making a forming web comprising coextruding an outer sealable layer, an interior barrier layer of a polymeric material with low oxygen transmission, a bulk layer and an inner adherent layer, and adhesive layers disposed between the outer sealable layer and the interior layer, between the interior layer and the bulk layer, and between the bulk layer and the inner adherent layer; cooling the coextruded web; and winding up the cooled web.

BRIEF DESCRIPTION OF THE DRAWINGS

The invention may be further understood by reference to the drawings in which.

DESCRIPTION OF THE PREFERRED EMBODIMENTS

Figure 1:
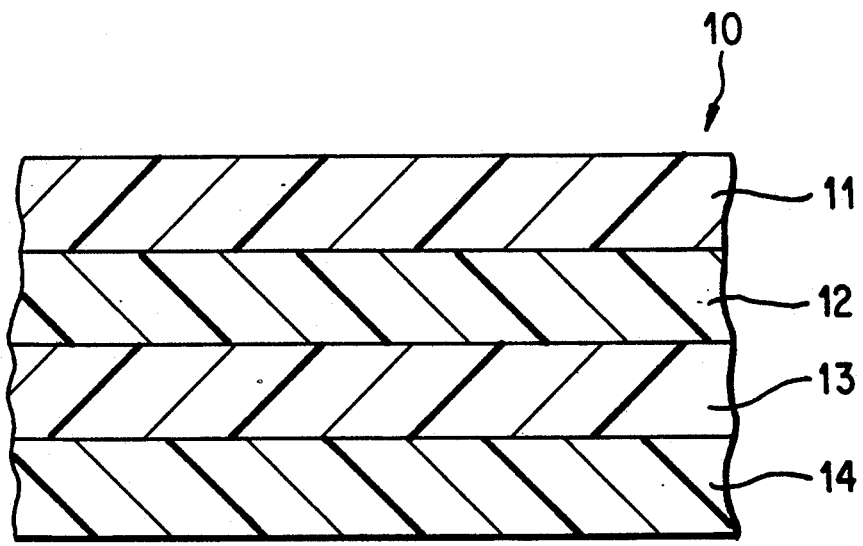
FIG. 1 is a cross sectional view of a forming web in accordance with the present invention.

Referring to FIG. 1, a forming web 10 includes an outer sealable layer 11, an interior barrier layer 12 comprising a polymeric material with low oxygen transmission; a polymeric layer 13 which adds bulk to the web; and an inner adherent layer 14 comprising a polymeric material such as ethylene acrylic acid copolymer (EAA), ethylene methacrylic acid copolymer (EMAA), tackified ethylene vinyl acetate copolymer (EVA), and chemically modified olefin polymer or copolymer.

The outer sealable layer is preferably a heat sealable polymeric material such as low density polyethylene (LDPE), linear low density polyethylene (LLDPE), very low density polyethylene (VLDPE), ethylene vinyl acetate copolymer (EVA), and blends of these materials. Ethylene alkyl acrylate such as ethylene n-butyl acrylate copolymer (EnBA), ethylene ethyl acrylate copolymer (EEA), and ethylene methyl acrylate copolymer (EMA); as well as ethylene acrylic acid copolymer (EAA), ethylene methacrylic acid copolymer (EMAA), and ionomer are also suitable, though less preferred resins for sealable layer 11.

The interior barrier layer 12 includes a polymeric material with low oxygen transmission characteristics, such as ethylene vinyl alcohol copolymer (EVOH); amorphous nylon; polyamides such as nylon 6, nylon 11, nylon 12, and nylon 610; copolyamides such as nylon 6,12, nylon 6,66 and nylon 6,69; and blends of these materials.

By "low oxygen transmission" is meant a transmission, at 0% relative humidity, of less than about 150 cc/square meter/atmosphere/24 hours (ASTM D 3985) at one mil thickness and at room temperature; preferably less than 100 cc/square meter; more preferably less than 50 cc/square meter.

The bulk layer 13 includes a polymeric material such as polystyrene, high impact polystyrene, and styrene copolymers (all of these collectively herein as "PS"); polyamide and copolyamide (collectively herein as PA); and polyolefins such as propylene homopolymer and propylene copolymer (collectively herein as PP), linear low density polyethylene (LLDPE), very low density polyethylene (VLDPE), high density polyethylene (HDPE), and low density polyethylene (LDPE). For thermoforming applications, very high molecular weight versions of the HDPE and LDPE are preferred over lower molecular weight versions.

By "bulk" is meant a material that contributes to the tensile strength, bulkiness, abuse resistance, machinability, burn through resistance or other property of the final web.

Preferred styrene copolymers are styrene acrylonitrile copolymer, styrene methyl methacrylate copolymer; acrylonitrile butadiene styrene, styrene butadiene copolymer (e.g. E6760, E6780, EC 2100, and EB 6755 available from Chevron, KR-10 and KK-36 from Phillips, and Styron 484 available from Dow), styrene maleic anhydride copolymer, and styrene alkyl styrene copolymer.

It has been found that styrene rubber materials such as styrene butadiene copolymer contribute to the abuse resistance of the web. Materials with higher butadiene content (e.g. KR-10 with 25% by weight butadiene, EC 2100 with 18% butadiene) are therefore preferred for increased abuse resistance.

Inner adherent layer 14 preferably includes ethylene acrylic acid copolymer, ethylene methacrylic acid copolymer, tackified ethylene vinyl acetate copolymer, or chemically modified olefin polymer or copolymer.

The chemically modified olefin polymer or copolymer preferably comprises chemically modified ethylene ethyl acrylate copolymer, chemically modified ethylene methyl acrylate copolymer, chemically modified ethylene vinyl acetate copolymer, chemically modified LLDPE, chemically modified HDPE, chemically modified LDPE, or chemically modified PP.

When the web of the present invention is used as a forming web for lining the cavity of a container, layer 14 acts as an adherent for holding the web to the container during the filling, processing, distribution, storage and display of the container.

"Adherent" means a material which bonds to a paperboard or other container; or which can be sealed, such as by heat sealing, to other thermoplastic materials. "Tackified" means the blending, compounding, or copolymerization of a material to EVA to enhance its adhesive properties.

Figure 2:
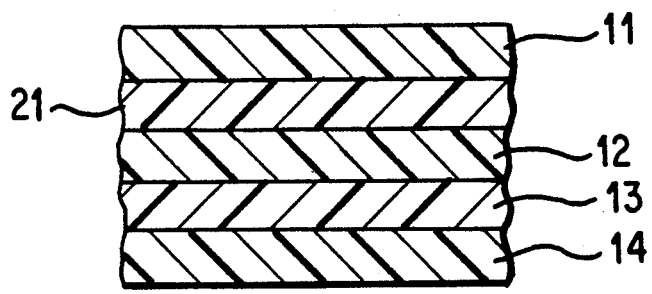
FIG. 2 is a cross sectional view of an alternative embodiment of a forming web in accordance with the present invention.

In FIG. 2, a polymeric adhesive layer 21 bonds outer sealable layer 11 to barrier layer 12. Adhesive layers are often desirable, and sometimes necessary in coextruded versions of the present forming web, in order to insure adequate interlaminar adhesion.

Preferred adhesives are chemically modified: low density polyethylene, linear low density polyethylene, very low density polyethylene, ethylene vinyl acetate copolymer ethylene methyl acrylate copolymer, and polypropylene.

Figure 3:
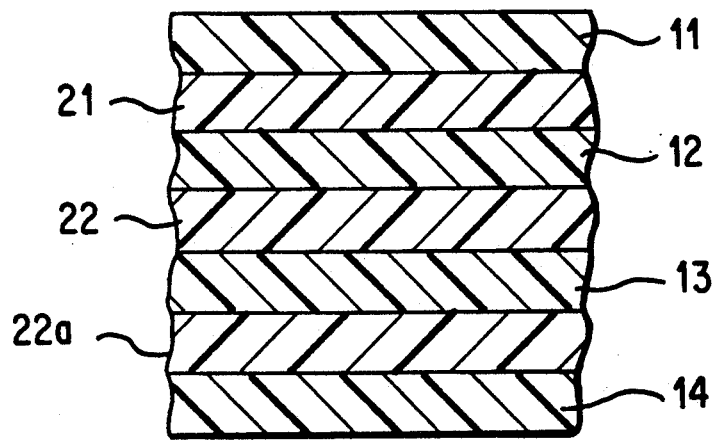
FIG. 3 is a cross sectional view of an alternative embodiment of a forming web in accordance with the present invention.

In FIG. 3, a polymeric adhesive layer 22 bonds interior barrier layer 12 to bulk layer 13. Polymeric adhesive layer 22a bonds bulk layer 13 to inner adherent layer 14.

Layers 22 and 22a are preferably made from the same material, although different resins can be used. Preferred adhesives are ethylene vinyl acetate copolymer and ethylene methyl acrylate copolymer, which are chemically modified to enhance their adhesive properties. This chemical modification is achieved e.g. by the use of acid or acid anhydride graft copolymers blended with a polyolefin base polymer or copolymer.

Figure 4:
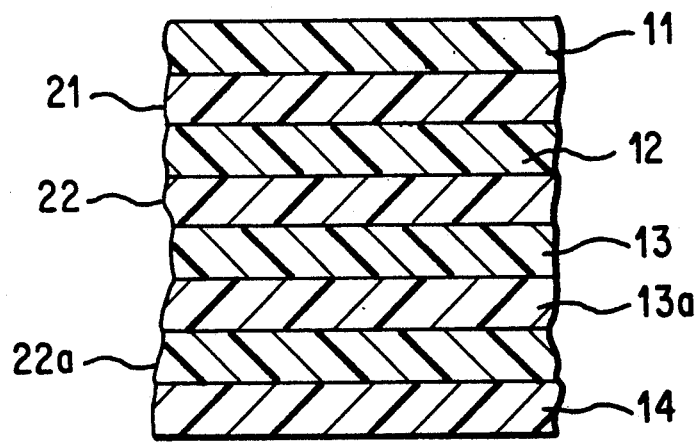
FIG. 4 is a cross sectional view of an alternative embodiment of a forming web in accordance with the present invention.

In FIG. 4, a forming web is shown like that of FIG. 3, but also including an additional bulk layer 13a.

Figure 5:
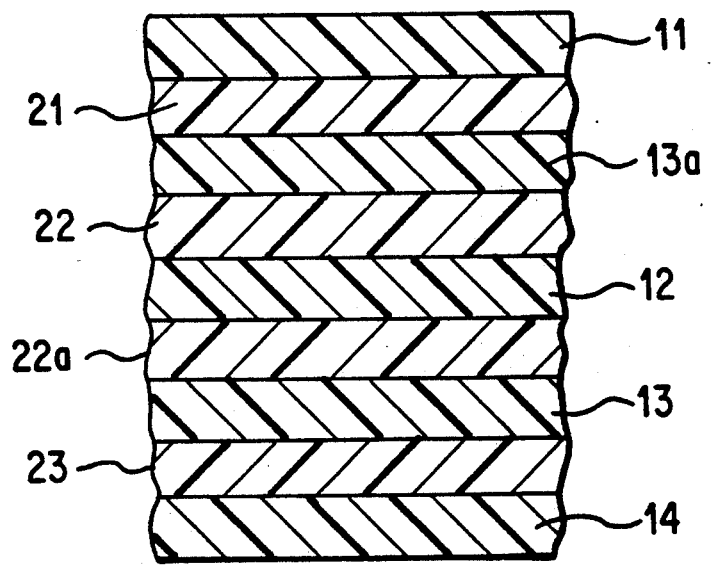
FIG. 5 is a cross sectional view of an alternative embodiment of a forming web in accordance with the present invention.

In FIG. 5, a forming web is shown having an outer sealable layer 11, non-adjacent bulk layers 13 and 13a, an interior barrier layer 12, and an inner adherent layer 14. Polymeric adhesive layers 21, 22, 22a and 23 bond the first mentioned layers as shown in the drawing. The adhesive of layer 23 preferably includes one or more of the materials described above for layers 22 and 22a.

The relative position of interior barrier layer or layers 12, and bulk layer or layers 13 and/or 13a can be reversed, and this may be desirable depending on the nature of the materials used for these layers, the intended end use of the web, and other factors. Thus, the bulk layer can be closer to the inner sealable layer than the interior barrier layer, or vice versa. Multiple layers of 12, 13 or 13a can be used, either as adjacent layers or as layers separated by one or more intervening layers. As an example, a bulk layer can be disposed on each side of the interior barrier layer (with or without intervening layers) as shown by example in FIG. 5.

The examples described below were made by coextrusion processes well known in the art, and specifically by single step coextrusion using a round or flat die in a cast process. Alternative processes such as extrusion coating, conventional lamination, etc. can also be used to make webs of this invention.

Webs of this invention can be cross-linked by irradiation or chemical means, although this is not preferred for webs for thermoforming end uses.

Table 1 identifies the resins used in the examples of Table 2.

TABLE 1

| | | |
|---|---|---|
| $EVA_1 =$ | ELVAX 3128 | (DU PONT) |
| $TIE_1 =$ | PLEXAR 3342 EVA-BASED | (QUANTUM) |
| $TIE_2 =$ | PLEXAR P107 EVA-BASED | (QUANTUM) |
| $TIE_3 =$ | PLEXAR P420 PP-BASED | (QUANTUM) |
| $TIE_4 =$ | 3190 EVA | (DUPONT) |
| $TIE_5 =$ | 760 EVA | (EXXON) |
| $TIE_6 =$ | NATR056 EnBA | (QUANTUM) |
| $TIE_7 =$ | XS12.04 EMA | (EXXON) |
| $TIE_8 =$ | E361 EVA-BASED | (DUPONT) |
| $TIE_9 =$ | XS54 EMA | (EXXON) |

TABLE 1-continued

| | | |
|---|---|---|
| $TIE_{10} =$ | MELTHENE 1352 TACKIFIED EVA | (TOSOH) |
| $TIE_{11} =$ | UE644 EVA | (QUANTUM) |
| $TIE_{12} =$ | PRIMACOR 1410 EAA | (DOW) |
| $TIE_{13} =$ | 3080 EVA-BASED | (DUPONT) |
| $TIE_{14} =$ | E327 EA-BASED | (QUANTUM) |
| $TIE_{15} =$ | MELTHENE 1506T TACKIFIED EVA | (TOSOH) |
| $TIE_{16} =$ | NUCREL EP1202 EMAA | (DUPONT) |
| $TIE_{17} =$ | 2201 TYMOR PP-BASED | (MORTON) |
| $TIE_{18} =$ | NUCREL EP1207 | (DUPONT) |
| $TIE_{19} =$ | PRIMACOR 1430 EAA | (DOW) |
| $TIE_{20} =$ | PRIMACOR 1420 EAA | (DOW) |
| $PS_1 =$ | E6760 | (CHEVRON) |
| $PS_2 =$ | E6780 | (CHEVRON) |
| $PS_3 =$ | S484 | (DOW) |
| $PS_4 =$ | EC2100 | (CHEVRON) |
| $PS_5 =$ | EB6755 | (CHEVRON) |
| $PP_1 =$ | PD020 | (EXXON) |
| $PP_2 =$ | 1002NF | (QUANTUM) |
| $PP_3 =$ | PF613 | (HIMONT) |
| $EVOH_1 =$ | EVAL E 151 | (EVALCA) |
| $EAO_1 =$ | LPZ25 | (EXXON) |
| $EAO_2 =$ | DOWLEX 3010 | (DOW) |

In Tables 1 and 2, "Tie" refers in its conventional sense to the polymeric adhesive layers, especially chemically modified polymers, which bond other layers of the web structure together.

The term is also used herein to identify and describe the preferred resins for the inner adhering layer 14. In the preferred embodiment, these resins (generally not chemically modified) bond the forming web of the invention to a rigid or semirigid container, especially one made from corrugated paperboard.

"EAO" refers to linear ethylene alpha olefin copolymers, especially linear low density polyethylene and very low density polyethylene.

"EA" with respect to the E327 material means an ethylene acrylate-based material.

TABLE 2

The following films were produced by coextrusion of various combinations of the individual resins through a coextrusion die:

| EXAMPLE | STRUCTURE |
|---|---|
| 1 | $EVA_1/TIE_1/PS_3/TIE_1/EVOH_1/TIE_2/TIE_4$ |
| 2 | $EVA_1/TIE_1/PS_2/TIE_1/EVOH_1/TIE_2/TIE_4$ |
| 3 | $EVA_1/TIE_1/PS_1/TIE_1/EVOH_1/TIE_2/TIE_4$ |
| 4 | $EVA_1/TIE_1/PS_3/TIE_1/EVOH_1/TIE_2/TIE_5$ |
| 5 | $EVA_1/TIE_1/PS_3/TIE_1/EVOH_1/TIE_2/TIE_6$ |
| 6 | $EVA_1/TIE_1/PS_3/TIE_1/EVOH_1/TIE_2/TIE_7$ |
| 7 | $EVA_1/TIE_1/PS_3/TIE_1/EVOH_1/TIE_2/TIE_2$ |
| 8 | $EVA_1/TIE_1/PS_1/TIE_1/EVOH_1/TIE_2/TIE_2$ |
| 9 | $EVA_1/TIE_3/PP_1/TIE_3/EVOH_1/TIE_2/TIE_4$ |
| 10 | $EVA_1/TIE_3/PP_2/TIE_3/EVOH_1/TIE_2/TIE_4$ |
| 11 | $EVA_1/TIE_3/PP_3/TIE_3/EVOH_1/TIE_2/TIE_4$ |
| 12 | $EAO_1/TIE_8/PS_3/TIE_8/EVOH_1/TIE_8/PS_3/TIE_8/TIE_2$ |
| 13 | $EAO_1/TIE_9/PS_3/TIE_9/EVOH_1/TIE_1/PS_3/TIE_9/TIE_2$ |
| 14 | $EAO_1/TIE_1/PS_3/TIE_1/EVOH_1/TIE_1/PS_3/TIE_1/TIE_2$ |
| 15 | $EAO_1/TIE_1/PS_3/TIE_1/EVOH_1/TIE_1/PS_3/TIE_1/TIE_{10}$ |

-continued

| EXAMPLE | STRUCTURE |
|---|---|
| 16 | $EAO_1/TIE_1/PS_3/TIE_1/EVOH_1/TIE_1/PS_3/TIE_1/TIE_{11}$ |
| 17 | $EAO_1/TIE_1/PS_3/TIE_1/EVOH_1/TIE_1/PS_3/TIE_1/TIE_1$ |
| 18 | $EAO_1/TIE_1/PS_3/TIE_1/EVOH_1/TIE_1/PS_3/TIE_1/TIE_{12}$ |
| 19 | $EAO_1/TIE_1/PS_3/TIE_1/EVOH_1/TIE_1/PS_3/TIE_1/TIE_{13}$ |
| 20 | $EAO_1/TIE_1/PS_3/TIE_1/EVOH_1/TIE_1/PS_3/TIE_1/TIE_{14}$ |
| 21 | $EAO_1/TIE_9/PP_2/TIE_3/EVOH_1/TIE_3/PP_2/TIE_9/TIE_2$ |
| 22 | $EAO_1/TIE_3/PP_2/TIE_3/EVOH_1/TIE_3/PP_2/TIF_3/TIE_2$ |
| 23 | $EAO_1/TIE_3/PP_2/TIE_3/EVOH_1/TIE_3/PP_2/TIE_3/TIE_1$ |
| 24 | $EAO_2/TIE_2/EVOH_1/TIE_1/PS_1/PS_1/TIE_1/TIE_{16}$ |
| 25 | $EAO_2/TIE_2/EVOH_1/TIE_1/PS_1/PS_1/TIE_1/TIE_{12}$ |
| 26 | $EAO_2/TIE_2/EVOH_1/TIE_1/PS_1/PS_1/TIE_1/TIE_{14}$ |
| 27 | $EAO_2/TIE_2/EVOH_1/TIE_1/PS_1/PS_1/TIE_1/TIE_{15}$ |
| 28 | $EAO_2/TIE_2/EVOH_1/TIE_1/PS_1/PS_1/TIE_1/TIE_{10}$ |
| 29 | $EAO_2/TIE_2/EVOH_1/50\% \ TIE_1 + 50\% \ TIE_9/PS_1/PS_1/50\% \ TIE_1 + 50\% \ TIE_9/TIE_{10}$ |
| 30 | $EAO_2/TIE_2/EVOH_1/50\% \ TIE_1 + 50\% \ TIE_9/PS_2/PS_2/50\% \ TIE_1 + 50\% \ TIE_9/TIE_{10}$ |
| 31 | $EAO_2/TIE_2/EVOH_1/TIE_{17}/PP_2/PP_2/TIE_{17}/TIE_{10}$ |
| 32 | $EAO_2/TIE_2/EVOH_1/50\% \ TIE_{17} + 50\% \ TIE_9 /PP_2/PP_2/50\% \ TIE_{17} + 50\% \ TIE_9/TIE_{10}$ |
| 33 | $EAO_2/TIE_2/EVOH_1/TIE_1/70\% \ PS_4 + 30\% \ PS_1/70\% \ PS_4 + 30\% \ PS_1/TIE_1/TIE_{16}$ |
| 34 | $EAO_2/TIE_2/EVOH_1/TIE_1/70\% \ PS_4 + 30\% \ PS_1/70\% \ PS_4 + 30\% \ PS_1/TIE_1/TIE_{18}$ |
| 35 | $EAO_2/TIE_2/EVOH_1/TIE_1/70\% \ PS_4 + 30\% \ PS_1/70\% \ PS_4 + 30\% \ PS_1/TIE_1/TIE_{19}$ |
| 36 | $EAO_2/TIE_2/EVOH_1/TIE_1/70\% \ PS_4 + 30\% \ PS_1/70\% \ PS_4 + 30\% \ PS_1/TIE_1/TIE_{20}$ |
| 37 | $EAO_2/TIE_2/EVOH_1/TIE_1/70\% \ PS_4 + 30\% \ PS_1/70\% \ PS_4 + 30\% \ PS_1/TIE_1/TIE_{12}$ |
| 38 | $EAO_2/TIE_2/EVOH_1/TIE_1/50\% \ PS_4 + 50\% \ PS_1/50\% \ PS_4 + 50\% \ PS_1/TIE_1/TIE_{12}$ |
| 39 | $EAO_2/TIE_2/EVOH_1/TIE_1/30\% \ PS_4 + 70\% \ PS_1/30\% \ PS_4 + 70\% \ PS_1/TIE_1/TIE_{12}$ |
| 40 | $EAO_2/TIE_2/EVOH_1/TIE_1/PS_4/PS_4/TIE_1/TIE_{12}$ |
| 41 | $EAO_2/TIE_2/EVOH_1/TIE_1/PS_5/PS_5/TIE_1/TIE_{12}$ |

In Examples 13 through 41, the bulk layer closest to the inner adherent layer contained about 10%, by weight of the layer, of a masterbatch which included the primary resin of that bulk layer (e.g. polypropylene in Example 32) and a white pigment concentrate.

In Examples 24 through 41, the outer sealable layer contained about 5%, by weight of the layer, of an anti-blocking agent having LLDPE or LDPE with diatomaceous silica.

Those skilled in the art will readily understand that modifications will become apparent after review of this description of the invention, and that such modifications are within the scope and spirit of the invention as claimed below.

Although the exact thickness of the forming web can vary, it is preferably between 10 and 20 mils thick.

The invention has been described herein as a forming web, but the term "forming web" is used herein to include webs of thermoplastic material, as structurally described herein, even when these materials are used in end uses not involving thermoforming or other forming steps.

What is claimed is:

1. A forming web comprising:
   a) an outer sealably layer;
   b) an interior barrier layer comprising a polymeric material with low oxygen transmission;
   c) a polymeric layer which adds bulk to the web, said polymeric material selected from the group, consisting of polystyrene polymer and copolymer; and
   d) an innermost adherent layer comprising a polymeric material selected from the group consisting of ethylene acrylic acid copolymer, ethylene methacrylic acid copolymer, tackified ethylene vinyl acetate copolymer, chemically modified ethylene ethyl acrylate copolymer, chemically modified ethylene methyl acrylate copolymer, chemically modified ethylene vinyl acetate copolymer, chemically modified linear low density polyethylene, chemically modified high density polyethylene, chemically modified low density polyethylene, and chemically modified polypropylene; said adherent layer capable of bonding to a paperboard or other container, or to other thermoplastic materials.

2. The web of claim 1 wherein the outer sealable layer is a heat sealable polymeric material selected from the group consisting of:
   a) low density polyethylene;
   b) linear low density polyethylene;
   c) very low density polyethylene;
   d) ethylene vinyl acetate copolymer;
   e) ethylene alkyl acrylate copolymer;
   f) ethylene acrylic acid copolymer;
   g) ethylene methacrylic acid copolymer;
   h) ionomer; and
   i) blends of these materials.

3. The web of claim 2 wherein the ethylene alkyl acrylate copolymer is selected from the group consisting of:
   a) ethylene n-butyl acrylate copolymer;
   b) ethylene ethyl acrylate copolymer; and
   c) ethylene methyl acrylate copolymer.

4. The web of claim 1 wherein the interior barrier layer comprises a polymeric material with low oxygen transmission selected from the group consisting of:
   a) ethylene vinyl alcohol copolymer;
   b) polyamide;
   c) copolyamide; and
   d) blends of these materials.

5. The web of claim 4 wherein the polyamide is selected from the group consisting of:
   a) amorphous nylon;
   b) nylon 6;
   c) nylon 11;
   d) nylon 12; and
   e) nylon 610.

6. The web of claim 4 wherein the copolyamide is selected from the group consisting of:
   a) amorphous nylon;
   b) nylon 6,12;
   c) nylon 6,66; and
   d) nylon 6,69.

7. The web of claim 1 wherein the bulk layer comprises a:

high impact polystyrene.

8. The web of claim 7 wherein the styrene copolymer is selected from the group consisting of:
a) styrene acrylonitrile copolymer;
b) styrene methyl methacrylate copolymer;
c) acrylonitrile butadiene styrene;
d) styrene butadiene copolymer;
e) styrene maleic anhydride copolymer; and
f) styrene alkyl styrene copolymer.

9. The web of claim 1 wherein the chemically modified olefin polymer or copolymer of the innermost adherent layer is selected from the group consisting of:
a) chemically modified ethylene ethyl acrylate copolymer;
b) chemically modified ethylene methyl acrylate copolymer;
c) chemically modified ethylene vinyl acetate copolymer;
d) chemically modified linear low density polyethylene;
e) chemically modified high density polyethylene;
f) chemically modified low density polymethylene; and
g) chemically modified polypropylene.

10. The web of claim 1 further comprising a polymeric adhesive layer disposed between the outer sealable layer and the interior barrier layer.

11. The web of claim 10 wherein the polymeric adhesive comprises a material selected from the group consisting of:
a) low density polyethylene;
b) linear low density polyethylene;
c) very low density polyethylene;
d) ethylene vinyl acetate copolymer;
e) ethylene methyl acrylate copolymer; and
f) polypropylene;
wherein the material is chemically modified to enhance its adhesive properties.

12. The web of claim 1 further comprising a polymeric adhesive layer disposed between the interior barrier layer and the bulk layer, and between the bulk layer and the innermost adherent layer.

13. The web of claim 12 wherein the polymeric adhesive layer comprises a material selected from the group consisting of:
a) ethylene vinyl acetate copolymer; and
b) ethylene methyl acrylate copolymer;
wherein the material is chemically modified to enhance its adhesive properties.

14. The web of claim 1 wherein the web is crosslinked.

15. The web of claim 14 wherein the web is crosslinked by irradiation.

16. A method of making a forming web comprising:
a) coextruding an outer sealable layer, an interior layer of a polymeric material with low oxygen transmission, a bulk layer of a polymeric material selected from the group consisting of polystyrene, polymer and copolymer, and an inner adherent layer, and adhesive layers disposed between the outer sealable layer and the interior layer, between the interior layer and the bulk layer, and between the bulk layer and the inner adherent layer;
b) cooling the coextruded web; and
c) winding up the cooled web.

17. The method of claim 16 wherein the web is crosslinked.

18. The method of claim 16 wherein the web is crosslinked by irradiation.

* * * * *

UNITED STATES PATENT AND TRADEMARK OFFICE
CERTIFICATE OF CORRECTION

PATENT NO. : 5,183,706
DATED : February 2, 1993
INVENTOR(S) : Solomon Bekele

It is certified that error appears in the above-indentified patent and that said Letters Patent is hereby corrected as shown below:

Column 7, line 51, change "sealably" to read --sealable--.

Column 7, line 55, after "group" delete ",".

Column 9, line 29, before "comprises" insert --layer--.

Signed and Sealed this

Eleventh Day of January, 1994

Attest:

BRUCE LEHMAN

Attesting Officer   Commissioner of Patents and Trademarks